United States Patent [19]
Sharp

[11] Patent Number: 5,314,044
[45] Date of Patent: May 24, 1994

[54] BRAKE BAND RETAINER MECHANISM

[75] Inventor: Brenner M. Sharp, St. Joseph, Mich.

[73] Assignee: Whirlpool Corporation, Benton Harbor, Mich.

[21] Appl. No.: 923,394

[22] Filed: Jul. 31, 1992

[51] Int. Cl.⁵ .............................................. F16D 51/00
[52] U.S. Cl. ................................. 188/77 R; 188/216
[58] Field of Search ............... 188/77 R, 171, 216, 188/26, 58; 192/80, 90

[56] References Cited

U.S. PATENT DOCUMENTS

| | | | |
|---|---|---|---|
| 811,562 | 2/1906 | Hunt | 188/77 R |
| 1,304,254 | 5/1919 | Bosek | 188/77 R |
| 2,678,703 | 5/1954 | Williams et al. | 188/77 |
| 3,115,218 | 12/1963 | Waldrop | 188/77 |
| 3,557,911 | 1/1971 | Ellard | 188/77 R |
| 3,710,643 | 1/1973 | Helmer | 74/606 R |
| 3,955,651 | 5/1976 | Hinderks | 188/77 R |
| 4,456,100 | 6/1984 | Manaki | 188/77 R |
| 4,732,016 | 3/1988 | Hirooka et al. | 68/23.7 |
| 4,774,822 | 10/1988 | Brenner | 68/133 |
| 4,891,959 | 1/1990 | Wood | 68/23.7 |

Primary Examiner—Robert J. Oberleitner
Assistant Examiner—Josie A. Ballato
Attorney, Agent, or Firm—Thomas E. Turcotte; Stephen D. Krefman; Thomas J. Roth

[57] ABSTRACT

A brake band retainer mechanism for an automatic washer is provided which ensures that the brake band will be held away from the brake drum when the brake is in the relaxed position, yet will be held close to the drum for ready engagement. A support frame for the brake assembly has four legs, one of the legs pivotally carrying a bracket to which the band is attached, two opposite legs have a flange thereon providing radial and vertical support for the band in its relaxed position, and a fourth, intermediate leg carrying a resilient member which presses against an outer surface of the band to bias the band against the support flange surfaces when the band is relaxed. The resilient member is held on the fourth leg without additional fasteners.

21 Claims, 3 Drawing Sheets ical hub surface

BRAKE BAND RETAINER MECHANISM

BACKGROUND OF THE INVENTION

The present invention relates to a retainer mechanism for a brake band and more particularly to a retainer mechanism for maintaining the brake band spaced away from a brake drum when the brake is in a relaxed or disengaged position.

Band brakes are utilized in a number of different appliances and devices to provide a retarding force to a rotating member. One particular use for such a band brake is an automatic washer such as that disclosed in U.S. Pat. No. 4,891,959, assigned to the assignee of the present application in which the brake band is used to engage against a drum connected for rotation with the washer basket such that the brake can be utilized to retard rotation of the basket.

When the brake band is in a relaxed or disengaged position, it is desirable that the band not engage any portion of the drum yet be positioned closely adjacent to the drum so that reactivation of the brake can be accomplished expeditiously.

U.S. Pat. No. 2,678,703 discloses the use of three spaced stop members which limit the expanding movement of the brake band. These stop members include a plunger which is spring loaded to press outwardly against an exterior surface of the brake band. The plunger carries a collar which has resilient fingers thereon which allow the plunger to move outwardly to a specific, but slight degree to accommodate wear of the brake band and to assure that the brake band in the relaxed position will always be maintained at a specific, close distance from the rotating drum.

U.S. Pat. No. 3,955,651 discloses the use of fixed guides 9 which receive looped wire protrusions from the brake band to guide and position the brake band in the relaxed condition.

U.S Pat. No. 4,456,100 discloses the use of integral fixed projections on a housing surrounding the rotating drum, the brake band engaging the projections in a relaxed state.

U.S. Pat. No. 3,710,643 discloses a brake band guide for an automatic transmission.

SUMMARY OF THE INVENTION

The present invention provides for a low cost, uncomplicated yet reliable retainer mechanism to urge the brake band into a non-contacting position when the brake is in a relaxed condition. In a preferred embodiment of the invention there are provided one or more rigid support walls which are positioned to support the brake band when it is in a disengaged position and at least one resilient member positioned to engage an outer surface of the brake band when it is in a disengaged position in order to pres the band into engagement with the support wall. By using, for example, two oppositely positioned support walls and one intermediate resilient member, the band can be urged into a non-contacting position around the circumference of the brake drum and will be adequately held away from contact with the drum during its disengaged condition, yet will be readily available for engagement with the drum as desired.

In the specific embodiment disclosed herein, where the apparatus is used with an automatic clothes washer, a support frame for carrying a brake band bracket is provided with support legs, two of which have inwardly directed flanges configured to provide the support wall structure for the band brake to provide support to the band in two perpendicular directions. That is, the band will be supported in a direction radial to the axis of rotation of the drum and also in a direction parallel to the axis of rotation of the drum.

The resilient member, which preferably is in the form of a single-loop configured elastomeric member is readily assembled onto the support frame, without use of additional fasteners, and is retained in a position to engage and bias the band when it is moved to a relaxed position.

Thus, the invention allows for an effective retainer mechanism requiring only one additional part, that being the single piece elastomeric member, which itself is assembled and retained in the mechanism without additional fasteners.

The invention thus provides all the functions and advantages required of a retainer mechanism at an absolutely minimal cost and minimal manufacturing outlay in terms of assembly time and complexity as well as inventory considerations.

DESCRIPTION OF PREFERRED EMBODIMENTS

Figure 1:
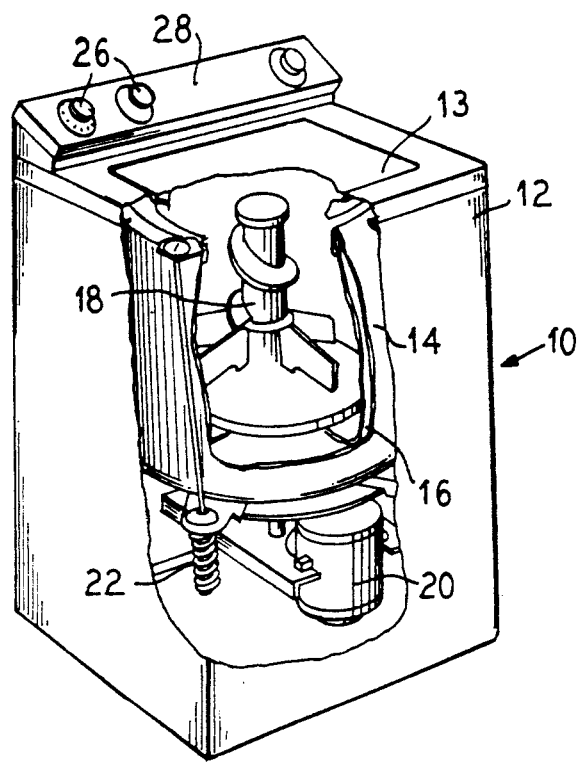
FIG. 1 is a perspective view of an automatic washer which provides an environment for the present invention.

In FIG. 1 there is illustrated an automatic washer generally at 10 embodying the principles of the present invention. The washer has an outer cabinet 12 with an openable lid 13 which encloses an imperforate wash tub 14 for receiving a supply of wash liquid. Concentrically mounted within the wash tub is wash basket 16 for receiving a load of materials to be washed and a vertical axis agitator 18. A motor 20 is provided which is drivingly connected to the agitator 18 to drive it in an oscillatory or rotary manner and is also selectively connectable to the basket 16 to rotate or oscillate it. The assembly of tubs, agitator and motor is mounted on a suspension system 22. A plurality of controls 26 are provided on a control console 28 for automatically operating the washer through a series of washing, rinsing and liquid extracting steps.

Figure 2:
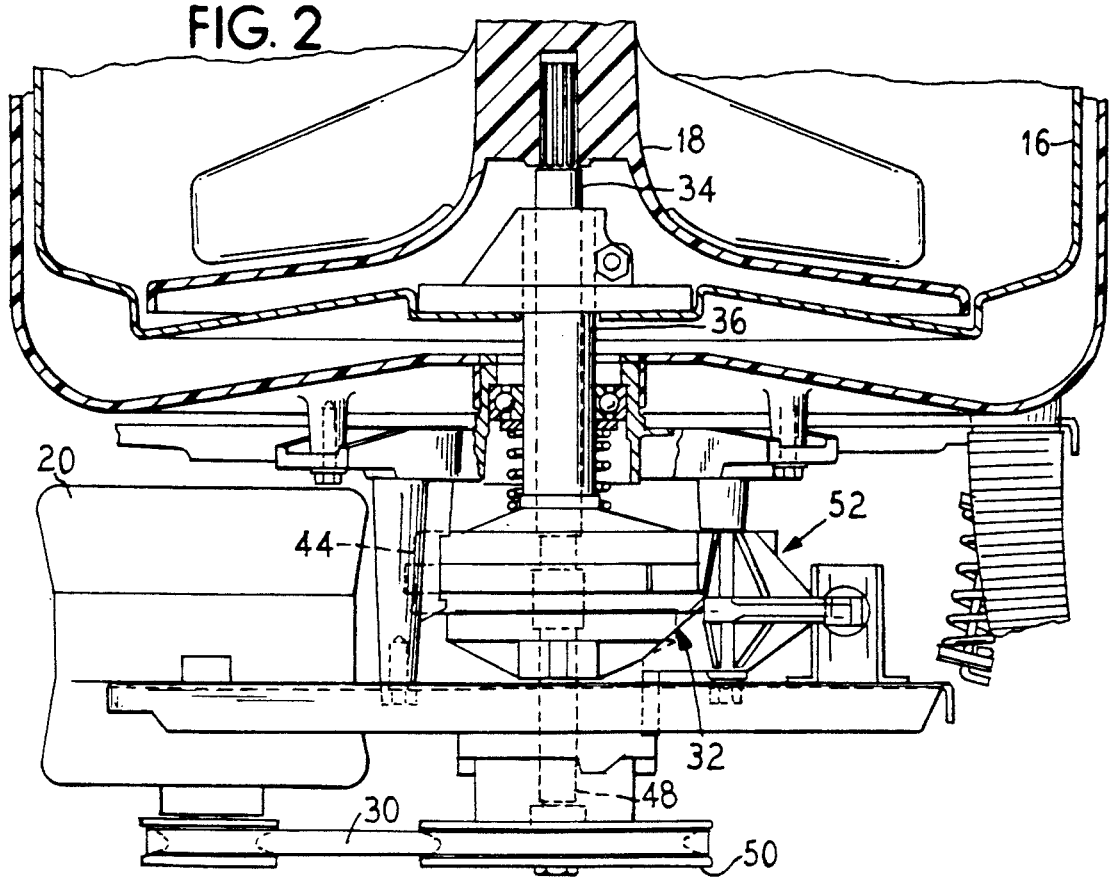
FIG. 2 is a partial side sectional view of the lower portion of the washer of FIG. 1.
Figure 4:
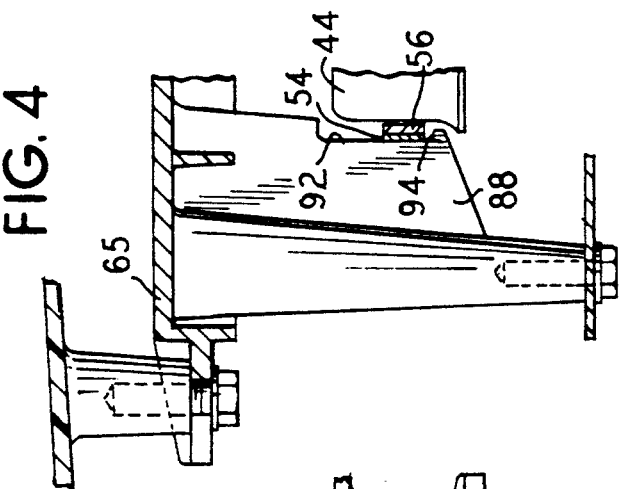
FIG. 4 is a detailed side sectional view of a support leg in the brake area of the washer.
Figure 3:
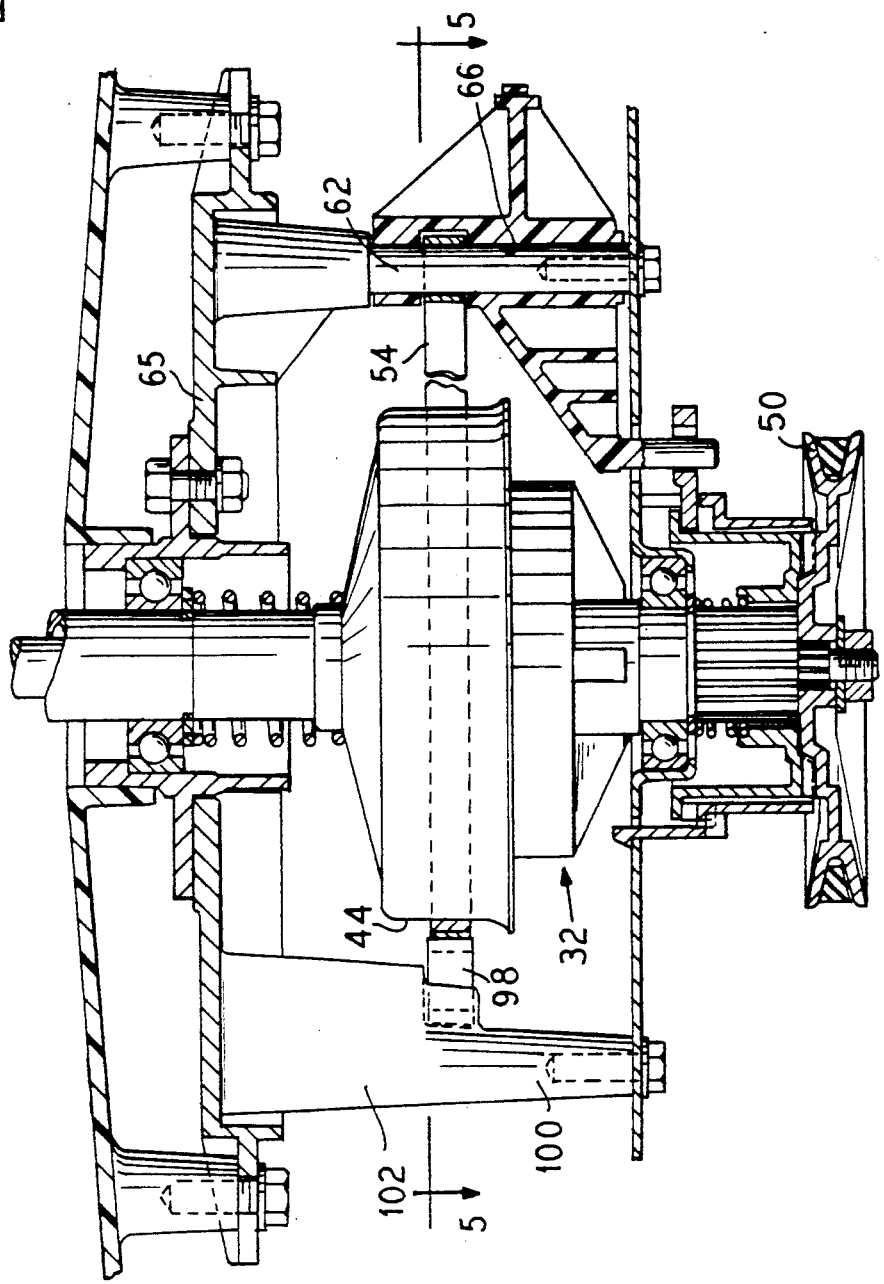
FIG. 3 is an enlarged side sectional view of the brake area of the washer of FIG. 1.

The drive mechanism is shown in greater detail in FIG. 2 where it is seen that the motor 20 is connected by means of a drive belt 30 to a gear arrangement assembly 32 to a vertical shaft 34 connected to the agitator 18. In this particular drive arrangement, the motor 20 may be a permanent split capacitor (PSC) motor which is to be reversely operated to provide the oscillatory motion to the agitator and basket. The wash basket 16 is connected via a spin tube 36 to the gear arrangement 32 which has an external generally cylindrical hub surface or drum 44. The vertical shaft 34 is connected, by means of the gear arrangement 32 to a shaft 48 connected to a pulley 50 which is rotated by the belt 30 connected to the motor 20.

When the washer is operating in the agitator mode, the motor 20 is operated in a reversing fashion which causes the shaft 48 to oscillate, thus driving the gear arrangement in alternating opposite directions. The agitator is therefore oscillated through its connection with the gear arrangement. The wash basket is held stationary during this operation and to provide the means for holding the basket 16 stationary, a band brake mechanism 52 shown best in FIGS. 3–6 is provided.

The mechanism comprises a brake band 54 having a high friction interior lining 56 which is engageable with at least a portion of the circumference of the hub 44 connected to the basket 16. A first end 58 of the band 54 is pivotally connected to a pivot bracket or crank 60 which is in turn pivotally connected to a fixed vertical post or leg 62 forming a part of a support frame 65 of the washer. A second end 64 of the band 54 is pivotally captured on the same post or leg 62 of the support frame as the bracket or crank 60. Thus, no additional mounting hardware is required for the brake band 54.

Figure 5:
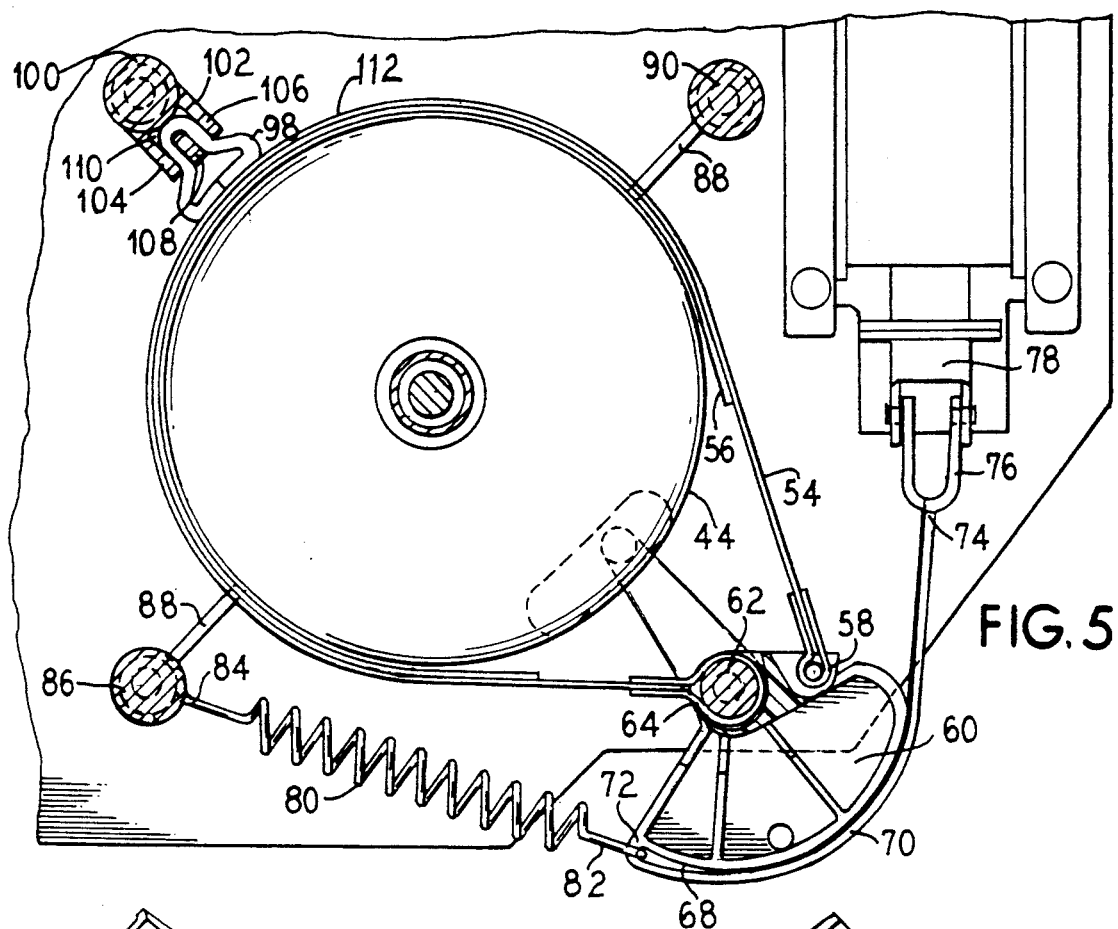
FIG. 5 is a top sectional view taken generally along the line 5—5 of FIG. 3.
Figure 6:
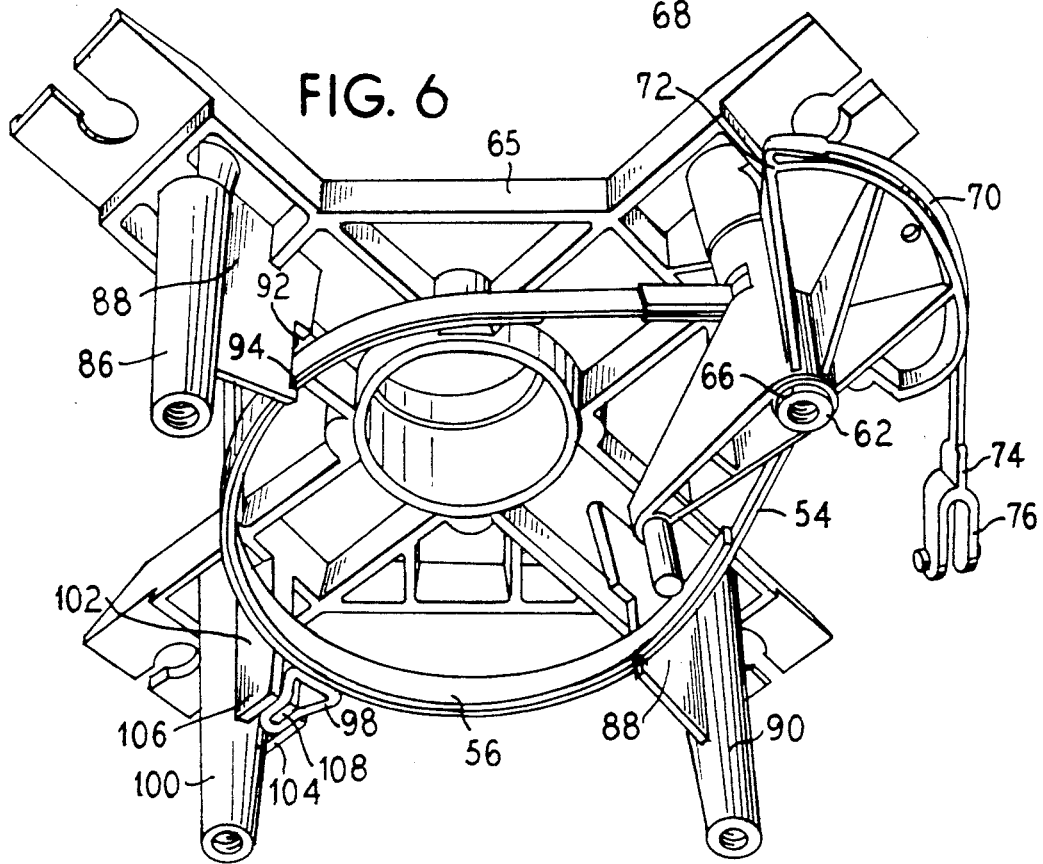
FIG. 6 is a bottom perspective view of the support frame for the brake band mechanism, removed from the washer.

As seen best in FIGS. 5 and 6, the bracket 60 is formed generally as a crank arm with a central bore 66 for receiving the leg or post 62 of the support frame 65. A radially outer surface 68 is formed in an arcuate shape and there is a strap 70 extending from one edge 72 of the arcuate wall area and overlying the arcuate wall. The strap 70 has a free end 74 with a connector portion 76 formed thereon which may be connected to a reciprocally moving member 78 such as a solenoid. As the reciprocally moving member 78 reciprocates, the bracket 60 is caused to pivot on the post or leg 62. Since the first end 58 of the band is pivotally mounted in an offset position relative to the post 62, the band 54 will be caused to tighten or loosen relative to the drum 44 as the bracket 60 is pivoted.

To ensure that the bracket 60 will pivot to a position causing a tightening of the band 54 on the drum 44, a tension spring 80 is attached at one end 82 to the bracket 60 at the point 72 of attachment of the strap 70. A second end 84 of the spring 80 is captured on a second post or leg 86 of the support frame 65. Thus, to loosen or deactivate the brake 52, the solenoid 78 must be energized to retract its actuator, thereby acting through the strap 70 to overcome the bias of the spring 80 to cause the bracket 60 to pivot. In this fashion, when power to the washer 10, or to the solenoid 78 is terminated, the brake 52 will be automatically engaged causing the motion of the wash basket 16 to be retarded or stopped.

In order to assure that the brake band 54 continues to be positioned accurately relative to the drum 44, both in a direction radial to the rotational axis of the drum, as well as in a direction parallel to the rotational axis, flanges 88 are formed on two opposite legs or posts 86,90 of the support frame 65, which flanges 88 have surface areas 92,94 designed to support the band in the two identified directions. Specifically, the flanges 88 are provided with recesses forming a perpendicular wall 92 and ledge 94 which provide the required support. To further ensure that the band 54 will engage the support surfaces 92,94 when the brake is in the relaxed position, a one piece elastomeric member 98 is carried on a fourth leg or post 100 of the support frame 65. The elastomeric member 98 and a flange 102 on the fourth post 100 are formed in a manner which permits the elastomeric member to be securely captured on the post without the need for additional fasteners.

It should be noted that location of wall 92 is critical due to potential stackup of tolerances than can contribute to a variation in the available gap between the brake band lining and the brake drum wear surface when the band is in the open or relaxed position. This tolerance stackup is minimized when, as in the preferred embodiment, wall 92 is machined in the same machining operation and fixture as the seat for the bearing that supports the shaft 34. This minimizes the potential of eccentricity in the relaxed, disengaged brake band to within a positional tolerance zone of 0.25mm and thereby eliminates the potential of a relaxed brake band forming an eccentric shape causing undesired contact with the rotating brake drum.

In a preferred embodiment, the elastomeric member 98 is formed as an open loop. The member 98 is preferably triangular in shape to assure the correct shape of the member, when distorted in the assembled unit; that is, when the member 98 is installed, two of the three sides are pinched.

The flange 102 has three spaced fingers 104,106,108 forming a channel 110 into which the elastomeric member can be received and retained. The elastomeric member 98 is configured and sized so that it will engage a radially outer surface 112 of the band 54 when the band is moved to a relaxed position. The resiliency of the elastomeric member will bias the band into engagement with the supporting surfaces 92 of the two flanges 88 so that the band will be positioned radially away from the drum 44 along its entire length, yet will remain close so that it can be quickly and readily moved into an engaging position as is necessary. Since the band 54 will be held away from the drum 44 when it is in its relaxed position, there will not be any noise due to rubbing of the band against the drum during periods when the brake 52 is not engaged, resulting in quieter operation of the appliance. Further, since there will not be any engagement of the band 54 during such times, there will be an energy savings due to removal of any drag between the band and the drum.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim:

1. A retainer mechanism for a brake band engageable and disengageable with a brake drum, comprising:
    at least one support wall positioned to support said brake band in two perpendicular directions when said brake band is in a disengaged position; and
    at least one resilient member positioned to directly engage an outer surface of said brake band when said brake band is in a disengaged position, and
    a support frame having at lest two integral legs, one of said legs being formed to provide said support wall and the other of said legs supporting said resilient member.

2. A retainer mechanism according to claim 1, further including a support frame having four integral legs, two opposed legs of said frame providing two of said support walls and an intermediate one of said legs supporting said resilient member.

3. A retainer mechanism according to claim 2, wherein said support wall comprises an integral a flange extending radially inwardly from said leg and having a surface to support said brake band in a direction radial to a rotational axis of said drum and a ledge to support said brake band in a direction parallel to said axis.

4. A retainer mechanism according to claim 1, wherein said resilient member comprises a one piece elastomeric member captured and retained in position relative to said brake band without the use of additional fasteners.

5. A retainer mechanism according to claim 1, wherein said brake band is carried on a bracket, with at least one end of said brake band being pivotally mounted on said bracket such that rotation of said bracket may cause said band brake to engage or disengage said brake drum.

6. The retainer mechanism according to claim 1 wherein said at least one support wall is machined relative to the axis of rotation of said brake drum.

7. A retainer mechanism for a brake band engageable and disengageable with a brake drum, comprising:
   at least one rigid, non-moving support wall positioned to support said brake band when said brake band is in a disengaged position; and
   at least one single-piece resilient member positioned to directly engage an outer surface of said brake band when said band is in a disengaged position and to urge said brake band into engagement with said support wall.

8. A retainer mechanism according to claim 7, further including a support frame having at least two integral legs, one of said legs providing said support wall and the other of said legs supporting said resilient member.

9. A retainer mechanism according to claim 7, further including a support frame having four integral legs, two opposed legs of said frame providing two of said support walls and an intermediate one of said legs supporting said resilient member.

10. A retainer mechanism according to claim 9, wherein said support wall comprises a flange extending radially inwardly from said leg and having a surface to support said brake band in a direction radial to a rotational axis of said drum and a ledge to support said brake band in a direction parallel to said axis.

11. A retainer mechanism according to claim 7, wherein said resilient member comprises a one piece elastomeric member captured and retained in position relative to said brake band without the use of additional fasteners.

12. A retainer mechanism according to claim 7, wherein said brake band is carried on a bracket, with at least one end of said brake band being pivotally mounted on said bracket.

13. The retainer mechanism according to claim 7 wherein said at least one support wall is machined relative to the axis of rotation of said brake drum.

14. An automatic washer having a rotatable wash basket, a brake mechanism for selectively retarding rotation of said wash basket and a retainer mechanism for said mechanism brake comprising:
   a support frame having at least three integral legs;
   a brake band bracket pivotally carried on one of said legs;
   a brake band having two ends held on said bracket;
   said support frame having a central open area for receiving a rotatable brake drum;
   said brake band encircling said brake drum;
   an integral support flange extending radially inwardly from at least one of said legs, said flange shaped so as to form a rigid ledge to support said brake band in a direction parallel to the axis of rotation of said brake drum and a rigid wall to support said brake band in a direction perpendicular to the axis of rotation of said brake drum; and
   a one-piece resilient member carried on at least one of said legs to directly engage an outer surface of said brake bad when it is a disengaged position.

15. A retainer mechanism for a brake band engageable and disengageable with a brake drum, comprising:
   a support frame having at least two integral legs;
   an integral support flange extending inwardly from at least one of said legs, said flange being shaped to form an engaging surface and ledge to support said brake band in two perpendicular directions when said brake band is in a disengaged position; and
   a one-piece resilient member carried on at least one of said legs to directly engage an outer surface of said brake band when said band is in a disengaged position.

16. A retainer mechanism according to claim 15, wherein said support frame has four integral legs, an integral support flange extends inwardly from two opposite legs and said resilient member is carried on a leg intermediate said two opposite legs.

17. A retainer mechanism according to claim 15, wherein said brake band has two free ends, one of said ends being held by a brake bracket and the other of said ends and said bracket being pivotally mounted on a fourth one of said legs such that rotation of said bracket may cause said brake band to engage or disengage said brake drum.

18. A retainer mechanism for a brake band engageable and disengageable with a brake drum, comprising:
   at least two fixed support walls positioned to support said brake band in two perpendicular directions when said brake band is in a disengaged position, and at least a one-piece resilient member positioned to directly engage an outer surface of said brake band when said band is in a disengaged position.

19. A retainer mechanism according to claim 18, further including a support frame having at least two legs, one of said legs providing said support walls and the other of said legs supporting said resilient member.

20. A retainer mechanism according to claim 18, further including a support frame having four integral legs, two opposed legs of said frame providing two of said support walls and an intermediate one of said legs supporting said resilient member.

21. A retainer mechanism according to claim 20, wherein said support wall comprises an integral flange extending radially inwardly from said two opposed legs and having a surface to support said brake band in a direction radial to a rotational axis of said drum and a ledge to support said brake band in a direction parallel to said axis.

* * * * *